Nov. 25, 1947.   T. C. FURNAS, JR   2,431,612
PICTURE AND MAP PROJECTOR
Filed May 4, 1945    4 Sheets-Sheet 1
FIG. 1.
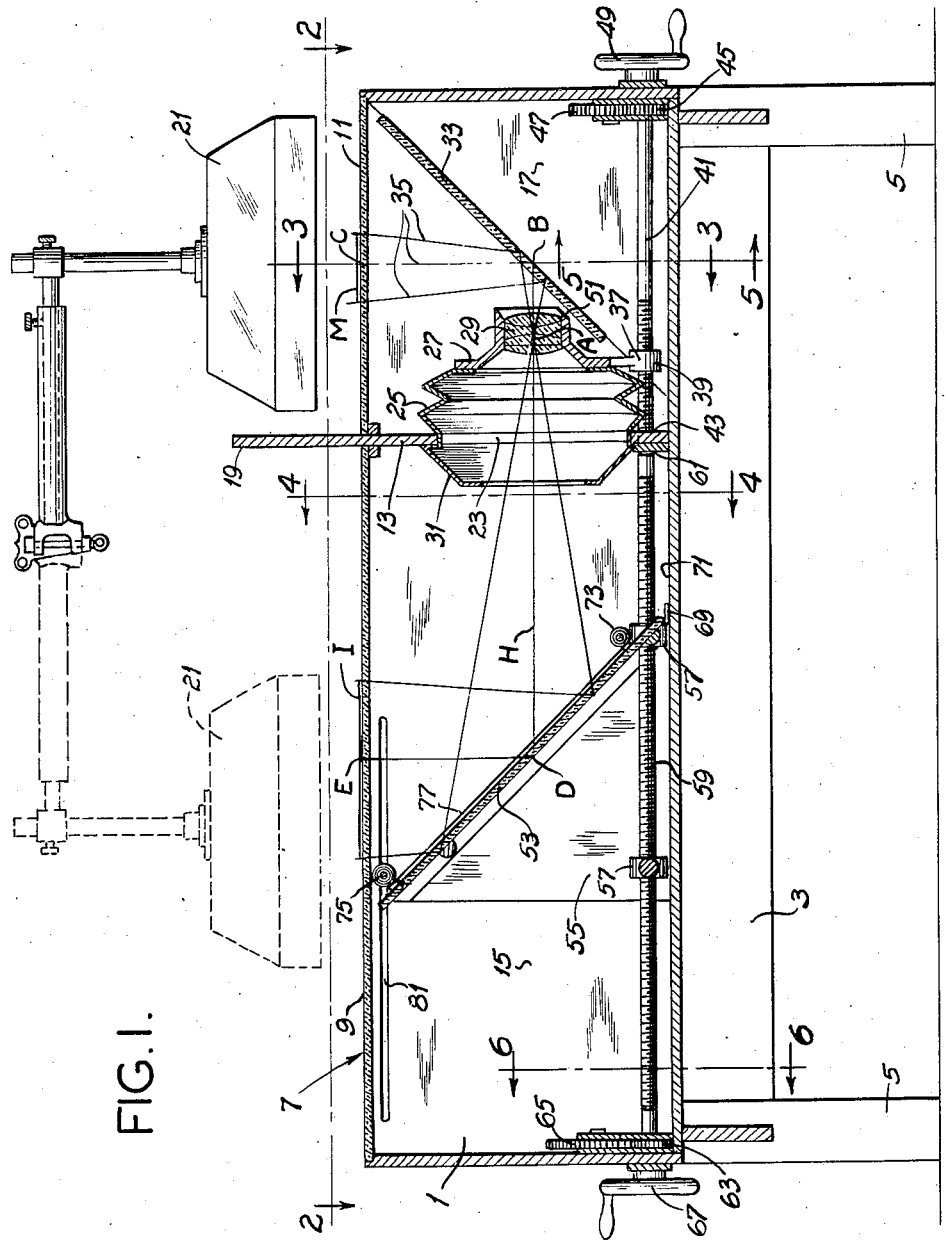

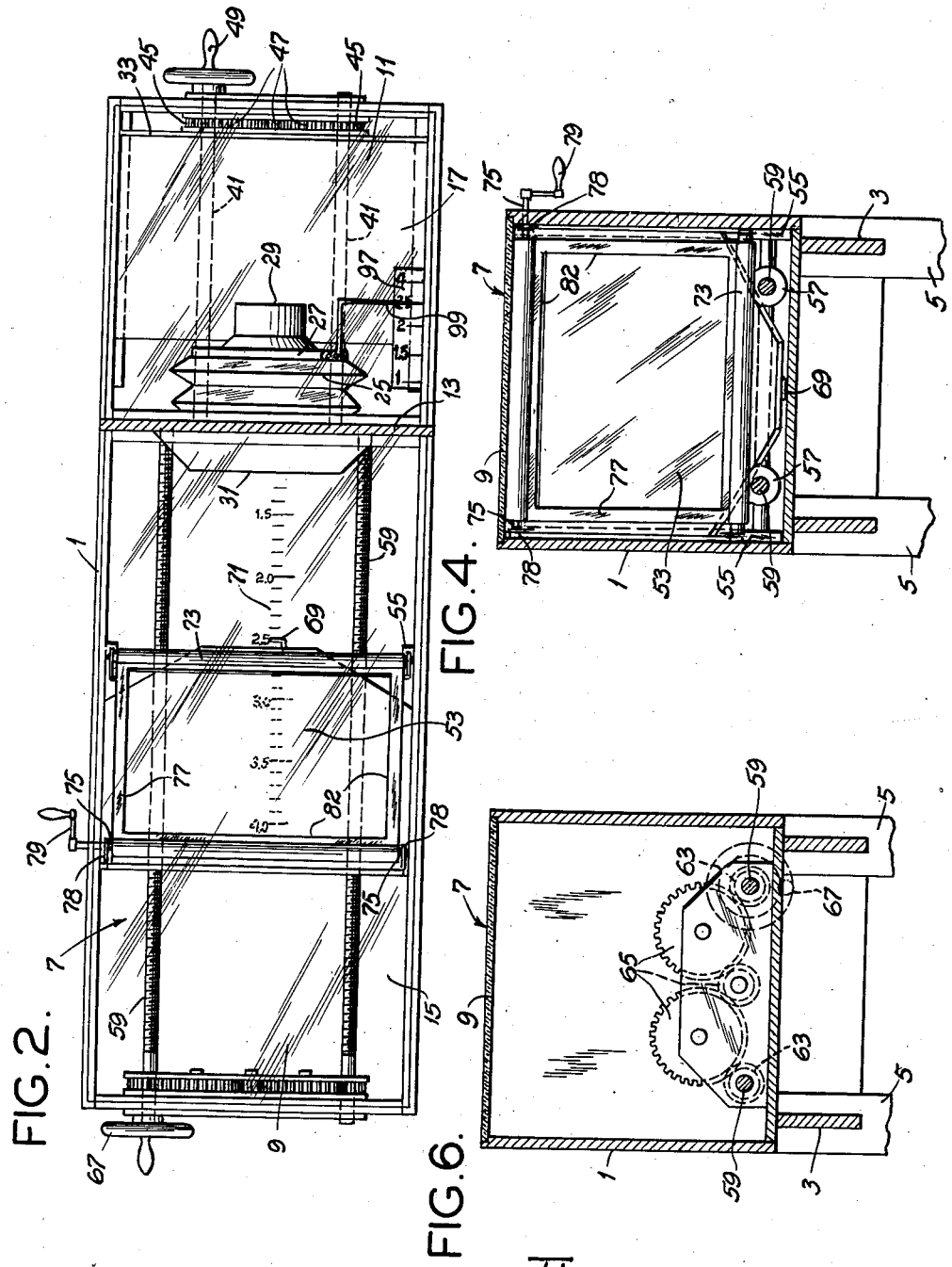

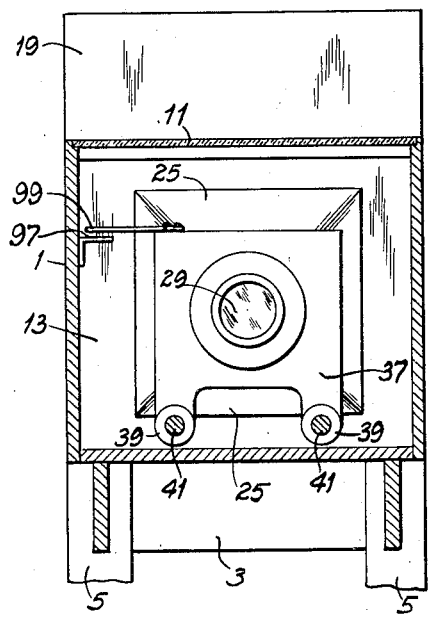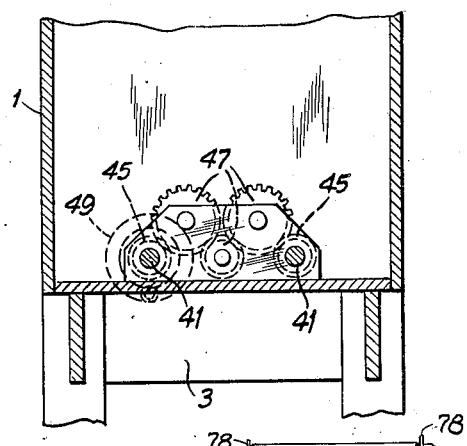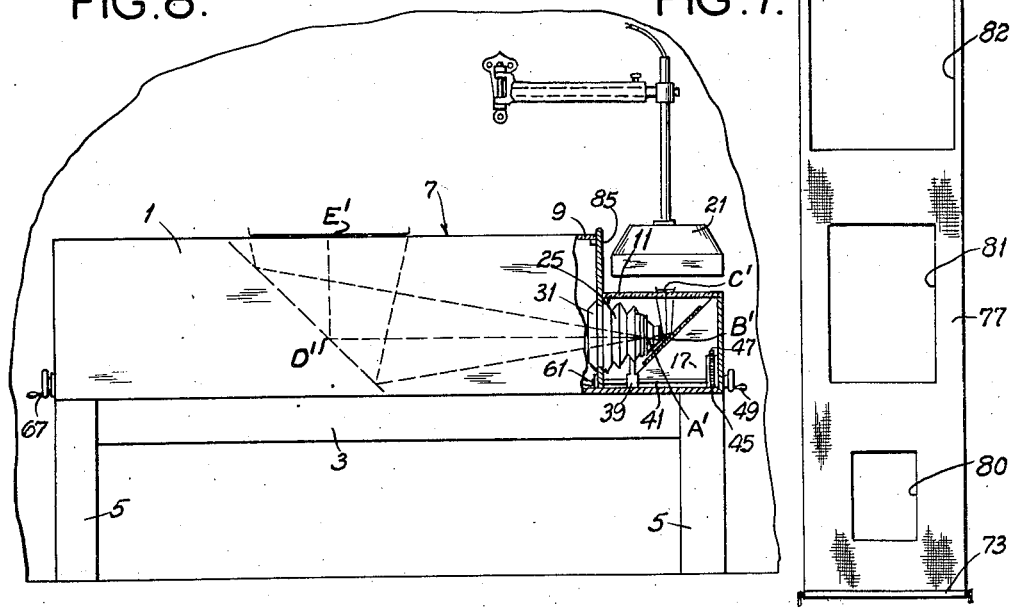

Nov. 25, 1947.  T. C. FURNAS, JR  2,431,612
PICTURE AND MAP PROJECTOR
Filed May 4, 1945  4 Sheets-Sheet 4

Thomas C. Furnas, Jr.,
Inventor.
Haynes and Koenig,
Attorneys.

Patented Nov. 25, 1947

2,431,612

UNITED STATES PATENT OFFICE 2,431,612

PICTURE AND MAP PROJECTOR

Thomas C. Furnas, Jr., St. Louis, Mo.

Application May 4, 1945, Serial No. 591,919

9 Claims. (Cl. 88—24)

This invention relates to projectors, and with regard to certain more specific features, to projectors for reproducing maps, pictures and similar data, preferably by tracing.

Among the several objects of the invention may be noted the provision of an adjustable projector in the form of a convenient tracing table on which is provided a convenient horizontal working surface for tracing either enlarged or reduced projected data without shadow interference; the provision of apparatus of this class in which all optical projection parts are protectively housed; the provision of apparatus of this class having illuminating means such that markings on one side of a sheet may be projected without interference from markings on the other side at a reduced or enlarged scale; the provision of a projector of the class described having convenient visible means for indicating degrees of enlargement or reduction and which has accessible controls for changing said degrees; and the provision of apparatus of this class which is economical to construct. Other objects will be in part obvious and in part pointed out hereinafter.

The invention accordingly comprises the elements and combinations of elements, features of construction, and arrangements of parts which will be exemplified in the structures hereinafter described, and the scope of the application of which will be indicated in the following claims.

In the accompanying drawings in which are illustrated several of various possible embodiments of the invention, Fig. 1 is a longitudinal section of one form of the invention;

Fig. 2 is a plan view taken on line 2—2 of Fig. 1;

Fig. 3 is a vertical section taken on line 3—3 of Fig. 1;

Fig. 4 is a vertical section taken on line 4—4 of Fig. 1;

Fig. 5 is a vertical section taken on line 5—5 of Fig. 1;

Fig. 6 is a vertical section taken on line 6—6 of Fig. 1;

Fig. 7 is a developed view on a reduced scale showing a completely extended light-control curtain;

Fig. 8 is a side elevation on a reduced scale, partly in section, showing an alternative embodiment;

Similar reference characters indicate corresponding parts throughout the several views of the drawings.

Figure 9:
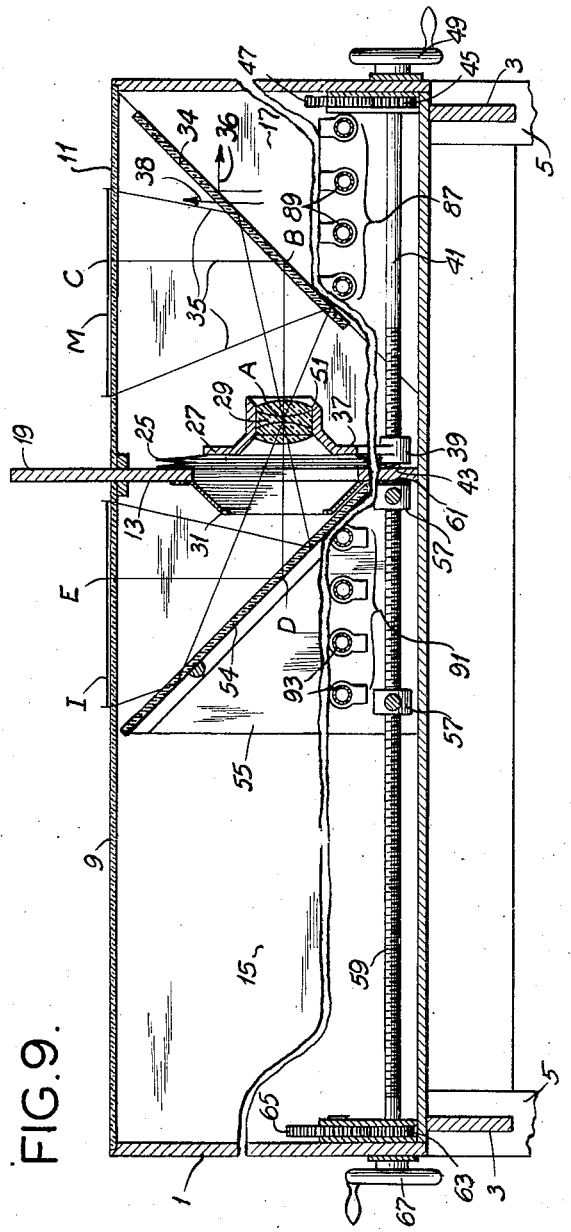
Fig. 9 is a view similar to Fig. 1, showing another embodiment, parts being broken out in order to reduce the height of the figure; and, Fig. 10 is a plan view of the lower broken-out parts of Fig. 9.

Heretofore projection apparatus for providing an image to be traced or otherwise duplicated has more or less followed the conventional lines used for ordinary photographic projection, the convenience of a tracer having been largely ignored. The tracer has been left to work in his own shadow, or with images of reduced effective intensity, or has undergone undue strain from uncomfortable position while tracing or from stray light striking the surface upon which the tracing was being made. All of this has been to the detriment of accuracy and convenience in working with the apparatus. The present invention overcomes the stated difficulties with very simple equipment.

Referring now more particularly to Fig. 1, there is shown at numeral 1 an elongate, horizontal, rectangular, box-like structure mounted upon a suitable base 3, the latter being supported, for example, upon legs 5. The bottom, sides and ends of the structure 1 are substantially light-tight. Its top surface 7 is made up of two pieces of transparent glass 9 and 11. Other transparent materials may be used at these locations.

The surface 7 composed of the glass sheets 9 and 11 is located at a convenient elevation for providing a working surface for a draftsman working around the sides of the device. Thus the surface 7 is not unlike that of a horizontal drawing table or desk. It is readily seen, however, that if it should be desired to perform all the operations from one side of this box, then the box and all the mechanism therein could be arranged to allow the mechanism and top to be tilted at a convenient angle toward that one side.

A light-tight partition 13 divides the box 1 into unequal coaxial compartments 15 and 17. This partition 13 extends upward above the surface 7, as indicated at 19, to prevent stray light as from the source used to illuminate the projected data and which may impinge upon one of the pieces of glass 9 or 11 from reaching the other. Light is obtained locally from an adjustable light source such as shown at 21, which may be directed either toward the glass 11 or the glass 9. This light source may be of the fluorescent variety which at high intensity operates at a relatively low temperature.

Joined around an opening 23 through the partition 13 is a camera-type of extensible bellows 25. This joins with the barrel element 27 of a photographic projection lens 29. The bellows 25 prevents light from passing through the partition 13, except through the lens 29. On the other side of the partition 13 is a hood or shade 31 which securely fastens the extensible bellows to the partition and which is adapted to minimize passage of stray light from the compartment 15 to the lens 29.

In the short compartment 17 is a reflecting mirror 33 shown located at an angle of approximately 45° to the axis of the lens and also to the plane of glass 11. This mirror is fixed in position and is adapted to project light rays from the upper surface of the glass 11 through the lens 29, as indicated by the rays as shown at 35. The direction of the light path of course may be reversed.

The barrel element 27 of the lens is supported upon a lens carriage 37, having lugs 39 through which are threaded rotary control rods 41 (Fig. 5). The latter have individual end bearings 43 at the bottom of the partition 13. At their other ends the rods 41 carry attached pinions 45. The pinions are connected by a gear train 47. Since there are three gears in this train, and all function as idlers, the angular motions of the control rods 41 are equal. One of the rods passes through an end wall of the box 1, where it is provided with a control wheel 49. By cranking the wheel 49, the axial position of the lens 29 may be adjusted with respect to the mirror 33. In the model illustrated the lens mount is beveled on its lower side, as indicated at 51, to allow as close an approach as possible to the surface of the mirror 33.

In the long compartment 15 is an axially movable mirror 53, also located substantially at a 45° angle with respect to the axis of the lens 29 and to the glass 9, and adapted to receive light rays from the lens 29 and project them upwardly toward the upper surface of the glass 9. The direction of this light path also may be reversed. This mirror 53 is mounted upon a movable carriage 55, the latter including threaded gears 57 for threaded engagement with threaded control rods 59, located at the bottom of compartment 15. The inner ends of these rods are in separate bearings 61. It is to be understood that the bearings 61 are separate from the bearings 43, so that the rods 59 may be operated independently of the rods 41.

As shown in Fig. 6, the rods 59 carry attached pinions 63 connected by an idler gear train 65, which causes the two rods to have the same angular velocity when one of them is rotated. One of the rods passes through an end wall of the box 1, and is provided with a control wheel 67. When the control wheel 67 is turned, the position of the mirror 53 is adjusted axially in the compartment 15. At the lower end of the mirror is a pointer 69 which traverses a scale 71 drawn on the bottom of the box 1 and visible through the glass 9. This scale 71 is computed to indicate the degree of enlargement or reduction obtained when the mirror 53 is located at any arbitrary position along the scale. It could be placed in many other conveniently accessible positions as, for example, along one side of the top of the box and the scale read by a pointer attached to the top of the mirror 53.

In combination with this scale 71 for facilitating the setting of the position of the movable mirror 53 for a predeterminded degree of enlargement or reduction, a corresponding scale 97 also computed for the particular lens used in the projector may be mounted in some convenient position in compartment 17, as shown. A pointer 99 is moutned upon the lens carriage and traverses this scale 97. This facilitates the process of focusing the projector since both the mirror and lens can be quickly set in their approximate proper positions and final fine adjustments made as necessary. The scale 97 and pointer 99 may be placed elsewhere.

In order to protect from the light any unneeded parts of the mirror 53, a black curtain roll is provided at 73. This roll is located cross-wise at the bottom of the mirror and has a spring winding bias operative toward winding down the curtain 77. The other end of the curtain is wound upon a cylinder 75, which is frictionally held in bearings 78 and exteriorly provided with a crank 79. The shaft 75 has an extension which passes out of the box 1 through a slot 81 providing for its longituidal movement along with the movement of the mirror 53. As indicated in Fig. 7, the curtain 77 has in it a series of framing openings 80, 81 and 82 of different sizes. Thus by operating the crank 79, one or the other of the openings 80, 81 or 82 may be placed over the mirror 53. Hence only necessary parts of the mirror are exposed for projection and stray light reflections are reduced.

It will be appreciated that an apertured curtain or any other masking device may be used anywhere in the path of the projection beam to reduce the effective field of the lens to the lesser portion desired or needed for any particular projection. However, the most advantageous positions for the apertured curtain 77 or other masking device are those near the reflectors 33 and 53 or near the glass working surfaces 9 and 11 because the beam then would be intersected in a less intense portion thereof and light more readily absorbed and less readily scattered within the bellows 25 or compartments 15 or 17.

At H is shown a horizontal light ray through the center and coincident with the axis of the lens 29. The respective distances measured from the points B and D where this ray strikes the mirrors 33 and 53 respectively, up to the top working surfaces of the coplanar glass sheets 9 and 11 are preferably approximately equal to the focal length of the lens 29. Thus each of the distances B—C and D—E approximate the focal length. This condition provides for approximately a maximum range of ratios of enlargement or reduction for a given length of the box 1 consistent with the maximum utilization of the corrected field of the lens 29, particularly at low ratios of enlargement or reduction. Such an arrangement, then, permits the maximum field to be projected at ratios near 1:1 and still permits the lens 29 to make the distance A—B—C a minimum consistent with the clearance needed between the lens and the mirror necessary for high projection ratios of, for example, 1:4 (or 4:1) or even 1:6 (or 6:1) with the form of the invention shown.

In Fig. 8 is shown a form of the invention for higher ratios of enlargement and reduction, in which like numerals designate like parts. In this case it is desirable to use as short a focal length of lens as possible. Thus to make the distance A'—B'—C' as small as possible, the glass 11 is lowered in position with respect to the lens as indicated at the step portion 85. In this case C'—B' is preferably less than the focal length of the lens but E'—D' is greater. Otherwise this form of the device is similar to that already described.

In the case of Fig. 1, the ratio of enlargement is equal to the distance $$\frac{A—B—C}{A—D—E}$$

In the case of Figure 8 it is $$\frac{A'—B'—C'}{A'—D'—E'}$$

Thus in the case of Fig. 8, the length A'—B'—C' is considerably reduced by the step 85.

The box 1, besides producing the form of a convenient working desk, also acts as an enclosure for the optical parts and protects them against undue collection of dust and the like.

Operation is as follows:

Assume that an enlargement is desired from transparent data, such as a transparent map M laid over the glass 11. The light from the lamp 21 shining through this map in effect forms an object for the projection lens 29. This is reflected from the mirror 33 and projected through the lens 29. The movable mirror 53 is set with its pointer 69 on the scale 71, showing the degree of enlargement desired. This is done by cranking the hand wheel 67. Then the hand wheel 49 is cranked to adjust the lens 29 until focus is obtained. The result will be an image on any piece of transparent tracing paper or the like that may lie upon the glass 9. This then may be traced conveniently. The image is indexed I in Fig. 1 and is upright longitudinally with respect to the map M. Light from the light source 21 shining upon the map M is prevented from reaching the glass 9 by the partition 19, so that it does not interfere with the clarity of image I. Any undesired or unused portions of the field of the projecting lens are masked by using an appropriate aperture of the curtain 77.

If it is desired projectively to reduce the data for tracing under the above conditions, the lamp 21 is placed at the dotted-line position shown in Fig. 1, the map M is placed over the glass 9 and the tracing paper over the glass 11.

It will be understood that, although the primary purpose of the apparatus is for manual tracing, the image I could be registered photographically on any sensitized material lying on the projection surface and subjected to the projection light while being suitably protected from surrounding light.

Although the control wheels 67 and 49 are shown as being independently manually adjustable, the screws 41 and 59 or other motive means such as rack and pinion gears could be connected through an auto-focus linkage for simultaneously adjusting the positions of the lens 29 and the mirror 53. Thus change of projection ratio could be accomplished without loss of focus. Such other motive means and auto-focus devices are old and therefore not shown.

Figure 10:
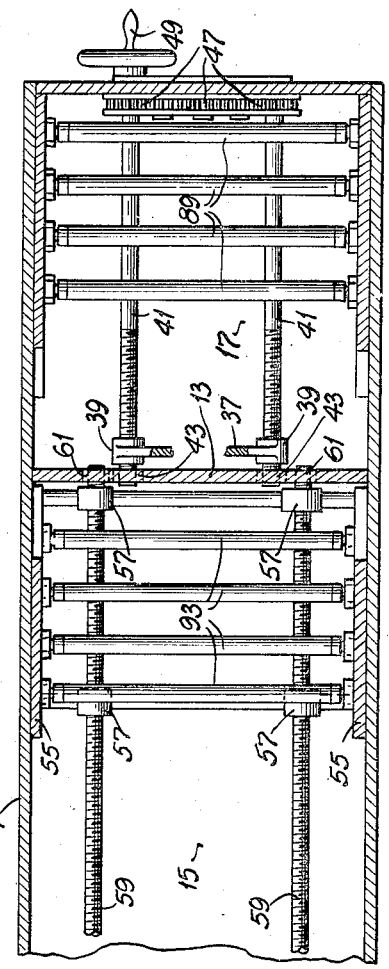

In Figs. 9 and 10 is shown another form of the invention in which an inside light source is used. Like numerals designate like parts. In this case, the device has been shown as set up for a 1:1 projection, instead of 2.5:1, as in Fig. 1.

Two light sources are used: The first, located in compartment 17 beneath the mirror 34 is a light source consisting of a horizontal bank 87 of fluorescent tubes 89. The second is a similar bank 91 of fluorescent tubes 93 supported upon the carriage 55 beneath the mirror 54 in compartment 15. For the light from either of these sources to illuminate an object on the transparent top 7 for projection, both mirrors 34 and 54 must be of the partially silvered type such as are used in interferometers. These mirrors are silvered only to such a degree that part of the light from behind them, such as from the lights 89 or 93 respectively, will be reflected while the remainder will pass through and beyond the mirror to illuminate an object upon the transparent working surface 11 or 9.

In Fig. 9 this partial reflection and partial transmission of light is illustrated respectively by the arrows 36 and 38 which represent rays of light from the lamps 89. The portion of the light which is reflected as shown by arrow 36 is absorbed by means of suitable, preferably dead black surfacing within the compartment 17 behind the mirror 34 so none of it will be reflected back through the mirror to interfere with the image being projected. The light which passes through the mirror as shown by arrow 38 is reflected from the object on the transparent top 11, then behaves exactly as light transmitted through a transparent object which would be illuminated from above as by the lamp 21 of Fig. 1; i. e., this light from the object would be reflected in part from the mirror 34 to and through the lens 29 then reflected in part again from the mirror 54 and brought to a focus at the transparent working surface 9. Of course some of the light would be lost in the several reflections from partially silvered surfaces, but the advantage gained in permitting the projection of images from surfaces which may be opaque or which may have markings on the reverse side would in many instances warrant the inclusion of this special feature despite its several complications regarding construction and the extra expense of the special mirrors.

The advantages of both the model for projecting from transparent data and the model for projecting from opaque data could be had with a single instrument having the lights mounted below the mirror mounts as shown in Figs. 9 and 10. A set of three mirrors one of which is partially reflecting to be used with one of the other two mirrors which are totally reflective would be carried on hand. The mirrors may be fitted interchangeably, using either two totally reflective ones or one partially reflective one and a totally reflective one in either compartment 15 or 17 respectively.

The lights 89 and 93 are placed in a position low enough with respect to the mirrors 54 and 34 so that no light which passes directly from either of these sources strikes the lens 29.

Provision is made for switching on and off either light bank 87 or 91. Thus, when the data is placed over the glass 11 for projection to the glass 9, only the lights 89 are lighted; whereas, when the data is placed on the glass 9 and projected to the glass 11, the lights 89 are turned out and lights 93 are turned on. This form of the invention permits the operator to project the markings from one side of a sheet without interference from markings on the other side, such as for example a page of a book.

In view of the above, it will be seen that the several objects of the invention are achieved and other advantageous results attained.

As many changes could be made in the above constructions without departing from the scope of the invention, it is intended that all matter contained in the above description or shown in the accompanying drawings shall be interpreted as illustrative and not in a limiting sense.

I claim:

1. A projector comprising a horizontally elongate box, an upper transparent wall for said box providing convenient working surfaces for tracing projections thereon, an essentially light-tight dividing partition within said box, said partition having an opening, essentially light-tight extensible means attached around said opening and extending into one compartment, a lens carriage, a lens on the carriage, said extensible means being attached to said carriage, a fixed reflector in said one compartment located at substantially 45° with respect to the axis of said lens and to the upper surface of the box, means for adjusting the position of said carriage with respect to said reflector, a movable reflector in the other compartment also located substantially at 45° with respect to the axis of said lens and to the upper surface of the box, and means for adjusting the position of said last-named reflector along the axis of said lens.

2. A projector comprising a horizontally elongate box, an upper lateral and transparent wall for said box providing convenient lateral working surfaces for tracing projections thereon, a vertical partition within said box dividing it into a relatively short compartment and a relatively long compartment, said partition having an opening, extensible means attached around said opening and extending into the short compartment, a lens carriage, a lens on the carriage, said extensible means being attached to said carriage, a fixed reflector in said short compartment located substantially at 45° with respect to the axis of said lens and the upper surface of the box, means for adjusting from the exterior of the box the position of said carriage and lens with respect to said reflector, a movable reflector in the long compartment also located substantially at 45° with respect to the axis of said lens and to the upper surface of the box, and means for adjusting the position of said last-named reflector from the exterior of the box.

3. A projector comprising a horizontal elongate box, an upper transparent wall for said box providing a convenient horizontal working surface for tracing projections thereon, a fixed partition within said box dividing it into a relatively short compartment and a relatively long compartment, said partition having an opening, a bellows attached around said opening and extending into the short compartment, a lens carriage, said bellows being attached to said carriage, a lens on the carriage, a fixed reflector in said short compartment located at an angle of substantially 45° with respect to the axis of said lens and the upper surface of the box, means for adjusting from the exterior of the box the position of said carriage with respect to said reflector, a movable reflector in the long compartment also located at an angle of substantially 45° with respect to the axis of said lens and the upper surface of the box, and means for adjusting the position of said last-named reflector from the exterior of the box along the axis of said lens, an adjustable masking device for limiting the cross section of a beam passing to and from the working surface and through the lens.

4. A projector comprising an elongate substantially horizontal box, an upper transparent substantially horizontal wall in said box, said wall forming a convenient working surface for tracing projections on the upper wall, a partition in the box having an opening therethrough, extensible means attached to the partition around said opening, a lens carriage in one of the compartments having said extensible means attached thereto, a lens on the carriage, means for axially adjusting said lens carriage from a point outside of the box, the axis of said lens being located below said transparent working surface at approximately the focal length of the lens, a fixed reflector located in the compartment containing the lens and located at an angle of substantially 45° with respect to the lens axis and to said upper working surface, an axially movable reflector in the other compartment movable along the axis of said lens and located at an angle of substantially 45° with respect to said axis and to said upper working surface, and means for adjusting the axial position of said last-named reflector operable from the exterior of the box.

5. A projector comprising a projection box having a transparent wall providing a working surface for tracing projections thereon, a fixed light-tight partition dividing said box into two compartments, said partition having an opening, essentially light-tight extensible means extending around said opening and extending into one compartment, a lens carriage in said one compartment, a lens on the carriage, said extensible means being connected around the lens, a fixed reflector in said one compartment located at substantially 45° with respect to the axis of said lens and to said transparent wall of the box, means for adjusting the position of said carriage with respect to said reflector, a movable reflector in the other compartment also located at substantially 45° with respect to the axis of said lens and to said transparent wall, index means associated with said movable reflector to indicate degrees of enlargement on reduction, and means for adjusting the position of said movable reflector in the direction of the axis of the lens.

6. A projector comprising an elongate horizontal box, a transparent wall forming the top side of said box and providing a working surface for tracing projections thereon, a fixed light-tight partition dividing said box into a short and a long compartment, said partition having an opening, essentially light-tight extensible means extending around said opening and extending into the short compartment, a lens carriage in said short compartment, a lens on the carriage, said extensible means being connected around the lens, a fixed reflector in said short compartment located at substantially 45° with respect to the axis of said lens and to said transparent wall, means for adjusting the position of said carriage with respect to said reflector, a movable reflector in the long compartment also located at substantially 45° with respect to the axis of said lens and to said transparent wall, index means associated with said movable reflector to indicate degrees of enlargement, and means for adjusting the position of said movable reflector in the direction of the axis of the lens.

7. A projector comprising an elongate box, an elongate transparent wall forming one side of the box and providing a working surface for tracing projections thereon, a partition within the box, a light-resistant member extending from the working surface near the plane of said partition, said partition having an opening, essentially light-tight extensible means attached around said opening and extending into one compartment, a lens carriage, a lens on the carriage, said extensible means being attached around the lens, a reflector in said one compartment, means for adjusting the position of said carriage with respect to the reflector, a reflector in the other compartment, and means for adjusting the position of the last-named reflector.

8. A projector comprising a projection box having a transparent wall providing a working surface for tracing projections thereon, a fixed light-tight partition dividing said box into two compartments, said partition having an opening, essentially light-tight extensible means extending around said opening and extending into one compartment, a lens carriage in said one compartment, a lens on the carriage, said extensible means being connected around the lens, a fixed reflector in said one compartment located at substantially 45° with respect to the axis of said lens and to said transparent wall of the box, means for adjusting the position of said carriage with respect to said reflector, a movable reflector in the other compartment also located at substantially 45° with respect to the axis of said lens and to said transparent wall, index means associated with said movable reflector to indicate degrees of enlargement or reduction, index means associated with the lens to indicate conditions of focus of the lens for the respective enlargements or reductions, and means for adjusting the position of said movable reflector in the direction of the axis of the lens.

9. A projector comprising an elongate box, said box having a transparent working surface on one side, a partition within the box forming two compartments therein, an adjustable lens associated with the partition, the axis of which lens is substantially parallel to said working surface, a mirror in each compartment located substantially at 45° with respect to the axis of the lens for projection between the parts of said working surface associated with the respective compartments, one of said mirrors being adjustable along the axis of the lens, index means associated with said adjustable mirror for indicating degrees of enlargement or reduction, and index means associated with said lens for indicating conditions of focus of the lens for the respective enlargements or reductions.

THOMAS C. FURNAS, Jr.

REFERENCES CITED

The following references are of record in the file of this patent:

UNITED STATES PATENTS

| Number | Name | Date |
| --- | --- | --- |
| 2,181,134 | Katz | Nov. 28, 1939 |
| 2,090,270 | Swanson | Aug. 17, 1937 |
| 2,186,330 | Fitzgerald | Jan. 9, 1940 |
| 1,199,942 | Taylor | Oct. 3, 1916 |
| 2,121,061 | Townsend | June 21, 1938 |
| 1,801,450 | Owens | Apr. 21, 1931 |
| 1,947,668 | Warmisham | Feb. 20, 1934 |
| 2,348,535 | Goodale | May 9, 1944 |
| 2,159,614 | Evans | May 23, 1939 |
| 1,904,347 | Barclay | Apr. 18, 1933 |